June 3, 1969

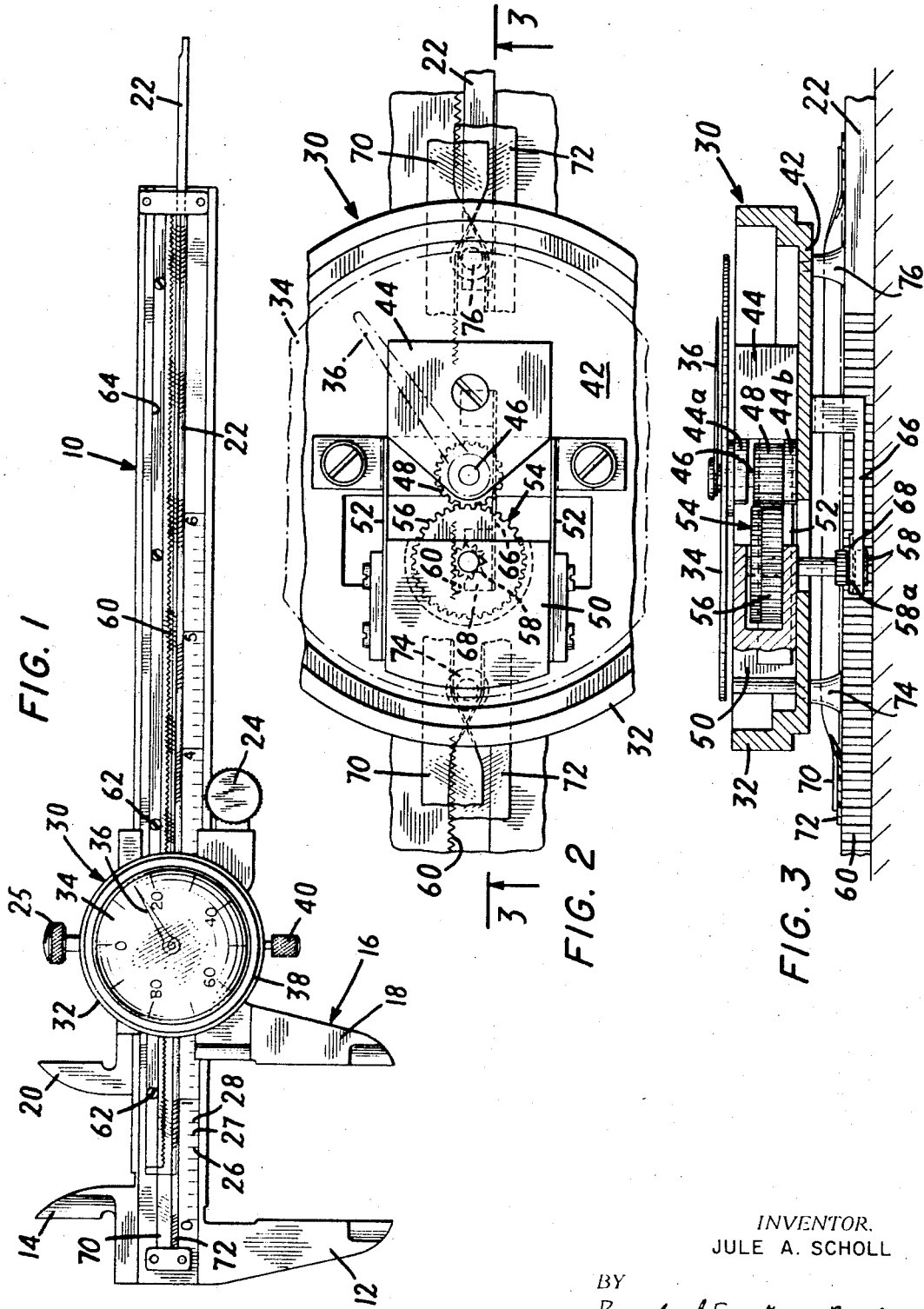

J. A. SCHOLL 3,447,244

CALIPER

Filed Aug. 7, 1967

INVENTOR.
JULE A. SCHOLL

BY

Brumbaugh, Free, Graves & Donohue his ATTORNEYS

United States Patent Office 3,447,244
Patented June 3, 1969

3,447,244
CALIPER
Jule A. Scholl, 41—31 51st St., Woodside, N.Y. 11377
Filed Aug. 7, 1967, Ser. No. 658,678
Int. Cl. G01b 5/02
US. Cl. 33—147                                     6 Claims

ABSTRACT OF THE DISCLOSURE

The dial read-out mechanism of the caliper includes a resiliently mounted, free floating cluster gear including a small gear meshing with and driven by the rack and a larger gear meshing with and driving the pinion to which the pointer is attached. The axes of rotation of the cluster gear and pinion are located in a plane parallel to the rack. A flexible cover on the caliper bar protects the rack against dust.

Background of the invention

This invention relates to a caliper embodying a novel and improved dial readout which enables precise readings of a measurement to be made easily and quickly with a minimum possibility of error.

It has heretofore been proposed to provide a dial readout for a caliper, a dial readout constituting a more convenient, surer and generally more precise way of exhibiting a measurement to the user than does a vernier. With a vernier there is always a significant chance of making an erroneous reading, inasmuch as the end reading requires noting several scale marks and properly identifying the mark on the vernier scale which lines up with a mark on the main scale. These and other factors constitute significant drawbacks to vernier calipers.

A caliper with a dial readout, on the other hand, provides much more reliability, especially insofar as erroneous readings by the user is concerned. The graduations on the dial face are relatively easy to read and to line up with the dial hand. A reading is composed solely of one reading from a scale on the caliper bar and a reading from the dial face.

One form of dial caliper known in the art comprises a dial readout mechanism consisting of an elongated gear rack on the bar, a dial case carried by the caliper carriage and a pinion meshing directly with the gear rack and carrying the dial hand. An important shortcoming of this form of dial caliper is that the gear teeth of both the rack gear and pinion gear cannot be made fine enough to yield a sufficient rotational movement of the pointer per increment of measurement to permit relatively refined graduation of the dial face. Thus, the dial calipers previously suggested in the art have been graduated with 200 marks, each representing 0.001 inch, but such marks are so close together that the caliper can not be accurately read with any higher accuracy than 0.002 inch, not only because the dial hand overlies two adjacent marks but because of the limited movement of the dial hand for an increment of measurement of say 0.001 inch. Moreover, the total dial indication of 0.2 inch makes for confusion and chance of mistake.

A further limitation of many dial calipers proposed heretofore in the art is that they are susceptible to fairly significant errors, both accumulated and transient. They have not been constructed with precision mechanisms to restrict as much as possible any chance for error.

Summary of the invention

There is provided, in accordance with the invention, a novel and improved caliper which overcomes the above-mentioned and other problems with previously used or proposed calipers and provides distinct and significant advantages, especially notable ones among them being a degree of precision of a high order and the capability of being conveniently, quickly, and accurately read by the user to, say, about the nearest 0.00025 inch to 0.00050 inch.

More particularly, the caliper of the invention comprises an elongated bar having a fixed jaw, a carriage mounted for longitudinal movement along the bar and having a jaw which cooperates with the fixed jaw to make a measurement of an object, and a dial readout mechanism carried by the carriage. The dial readout mechanism includes a case, a graduated dial face, a pinion gear rotatably mounted in the case and carrying a dial hand, and a multiplier gear. The multiplier gear includes a driving gear which meshes with and drives the dial hand pinion and an element which is driven in proportion to the extent of movement of the carriage along the bar by an element carried by the bar. In one embodiment the element carried by the bar and driving the multiplier is a gear rack, the driven element of the multiplier being a gear meshing with the gear rack. In another form, the element driving the multiplier is a tightwire extending longitudinally along the bar and making one or more turns around a pulley coupled to the driving gear of the multiplier.

Where the driven element of the multiplier is a gear, the multiplier is perferably mounted on the case of the readout mechanism for movement in the plane of the face of the caliper bar toward and away from the gear rack and is spring-loaded into firm engagement with the rack to ensure that there is no looseness in the gear engagement that might lead to error in the readout. Whether a rack or a tight wire drives the readout, it is advantageous to make either the driving gear of the multiplier or the pinion gear carrying the dial a split, spring-loaded anti-backlash gear, again to provide firmness in the gearing, in this case in the mesh between the multiplier driving gear and the dial hand pinion, and thereby reduce the readout error to a minimum.

In the embodiment having a rack which drives the driven gear of the multiplier, the movable mounting may take the form of a bearing block either pivotably or spring-mounted on the case, thus providing for floating movement as the driven gear moves along the gear rack. The driven gear of the multiplier preferably includes a peripheral groove around its center to receive a bifurcated element carried by a spring which urges the gear into engagement with the rack; this arrangement provides a centered spring force on the gear so that it is held against the rack with uniform pressure. It is also desirable to mount both the multiplier and the dial hand pinion on bifurcated bearing blocks. Both of the last-mentioned features further contribute to the precision of the readout by maintaining proper axial alignment of the gears at all times.

As a further feature of the embodiment of the caliper having a rack for driving the gear of the multiplier, a protective cover of flexible material can be installed over the rack to keep out dust that might otherwise interfere with the proper operation of the mechanism.

Brief description of the drawings

For a better understanding of the invention, reference may be made to the following description of an exemplary embodiment, taken in conjunction with the figures of the accompanying drawings, in which:

FIG. 1 is a plan view of a caliper constructed according to the invention;

FIG. 2 is a partial plan view of one form of the dial readout mechanism embodied in the caliper of FIG. 1, the view showing the readout mechanism with the dial face removed and with some portions broken away for improved illustration, the view is on a relatively larger scale than FIG. 1;

FIG. 3 is a side view in cross-section of the dial readout mechanism of FIG. 2, the view being taken generally along a plane defined by the lines 3—3 of FIG. 2 and in the direction of the arrows;

*Description of exemplary embodiments*

Figure 4:
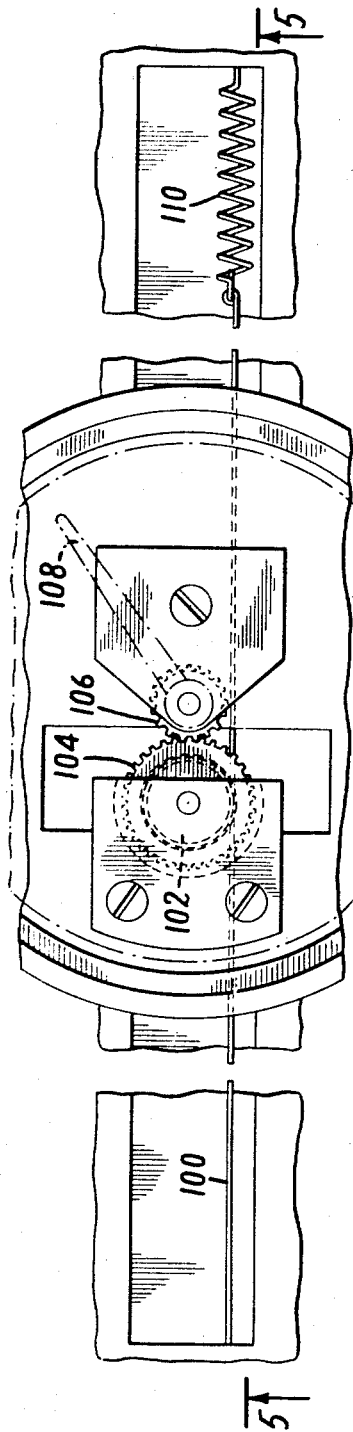
FIG. 4 is a plan view of another form of dial readout mechanism according to the invention, the mechanism being shown in semi-schematic form.

Referring first to FIG. 1, the caliper includes an elongated bar 10 having fixed jaws 12 and 14 extending laterally in opposite directions from one end and a carriage 16 mounted in any suitable manner for slidable movement longitudinally along the rack and having jaws 18 and 20 extending laterally from its opposite edges. The jaws 12 and 18 have straight edges facing each other and are adapted to engage an object between them for purposes of measuring it. The jaws 14 and 20 have outwardly facing straight edges for taking inside measurements of an object. Secured to the carriage is an elongated rod 22 which provides for making depth measurements, the depth measurements being taken from the end face of the caliper main bar 10. The carriage has a small rotatable knurled wheel 24 having a peripheral groove which rides along and frictionally engages the edge of the bar 10 upon application of thumb pressure and facilitates precise location of the carriage by thumb manipulation of the wheel. After the jaws have been set to take the measurement, the carriage may be locked in position on the bar by tightening a lockscrew 25. As described thus far, the caliper is basically the same as many known calipers, and it will be understood by those skilled in the art that the above-described parts may be of various specific designs and forms.

A measurement is made by carefully bringing the appropriate jaws (or the depth rod) into engagement with the part of the object to be measured and then reading off the measured value from appropriately numbered scale marks (e.g., 26, 27 and 28) on the bar and from a dial readout mechanism, which is designated generally in the drawings by the reference numeral 30, affixed to the carriage. In a preferred form, according to the invention, the scale marks are graduated in 0.1 inch and in the dial face is graduated in 0.001 inch, advantageously with small dots centered between the 0.001 inch line marks. Accordingly, the dial face can be read relatively easily to 0.0005 inch, and interpolations can be made with reasonable accuracy to 0.00025 inch.

One embodiment of the dial readout mechanism 30 according to the invention is shown in detail in FIGS. 2 and 3 of the drawings and is also shown in FIG. 1. As described below, however, another embodiment may be readily adapted to the configuration of the caliper shown in FIG. 1. Moreover, the alternative embodiment (FIGS. 4 and 5) includes a number of elements common to both embodiments, such elements as shown in FIGS. 1, 2 and 3, including a suitable case 32, a dial face 34 graduated as described above, a dial hand 36, a plastic or glass window (not clearly shown) and a rim 38 carrying the window. The dial face can be loosened and rotated by loosening a lock screw 40 to readjust the face to zero with the jaws closed or to set in a given, desired measurement to enable deviations from that prescribed measurement readily to be determined and read out.

Referring next to FIGS. 2 and 3, the case 32 includes a base plate 42 which carries the various parts of the readout mechanism and by which it is attached to the carriage 16. Affixed to the base 42 is a bifurcated bearing block 44 which rotatably mounts the shaft 46 of a pinion gear 48 carrying the dial hand 36, the block including spaced-apart plates 44a and 44b straddling the gear. A generally similar bifurcated bearing block 50 is mounted for movement in the plane of the caliper main bar, such as by means of springs 52 attached to the base, as shown, or springs attached to the block 44, or by a pivot mounting (not shown). A cluster multiplier gear, designated generally by the reference numeral 54 is rotatably mounted on the bearing block 50. The multiplier gear 54 includes a split, spring-loaded anti-backlash driving gear 56 which meshes with and drives the dial hand pinion 48, and a driven gear 58, the driven gear having a peripheral central groove 58a.

The driven gear 58 of the multiplier gear 54 meshes with and is driven by a gear rack 60 which extends longitudinally along substantially the entire length of the caliper main bar 10 and is secured, such as by screws 62, in a groove 64 in the bar (see FIG. 1). To ensure intimate and firm contact with the gear rack, the driven gear 58 is spring-loaded against it by a spring 66 affixed to the base and having a bifurcated tip 68 that is received in the groove 58a in the gear 58. Because the groove is centered in the gear, the gear is pressed with uniform pressure against the gear rack. As described above, the multiplier gear is mounted for floating movement on the case, so that it can move slightly toward and away from the gear rack 60 to compensate for any irregularities in the alignment of the gear rack or so that it can ride over dirt particles that might be lodged in the teeth of the gear rack, and of course the floating mounting of the multiplier also enables the spring 66 to urge the multiplier driven gear 58 into intimate engagment with the rack, as just described.

In operation, the gear 58 is driven by the rack 60 upon movement of the carriage 16 in either direction, movement of the carriage to the right (with respect to FIG. 1) resulting in counterclockwise movement of the gear, and vice versa, and consequently the driving gear 56 of the multiplier is also rotated. The driving gear 56 in turn drives the dial hand pinion 48, thereby rotating the dial hand 36. The design of the gear train of the readout mechanism is, of course, such that the dial hand is rotated in proportion to the movement of the carriage so that the dial hand reads out the value of any given increment of movement of the carriage. In the embodiment shown in FIG. 1, as mentioned above, the dial face is graduated to read in 0.001 inch from 0 to 100, while the caliper main bar 10 is graduated in 0.1 inch. Therefore, the gear train is designed to provide one revolution of the dial hand for every 0.1 inch movement of the carriage. To read out a measurement, the user notes the next preceding graduation mark on the caliper bar and adds to that value the reading of the dial face which is clearly indicated by the dial hand.

Figure 5:
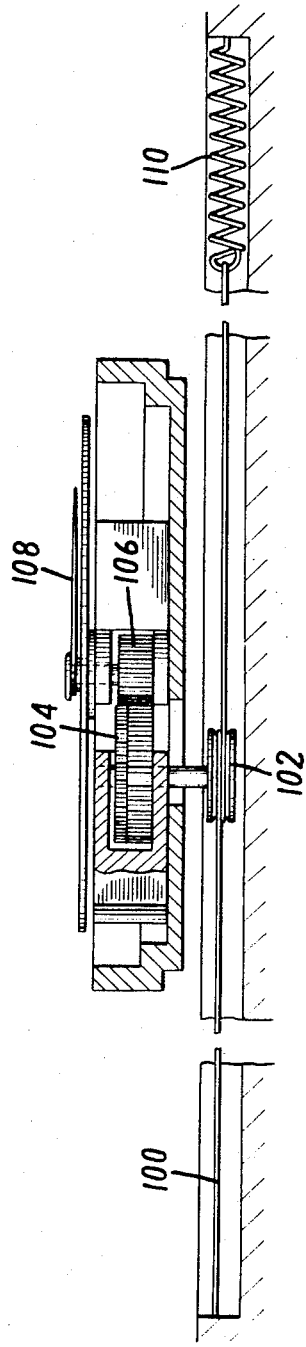
FIG. 5 is a side view in cross-section of the mechanism of FIG. 4, the view being taken generally along a plane designated by the lines 5—5 of FIG. 4 and in the direction of the arrows and also being in generally schematic form.

FIGS. 4 and 5 show a modified form of the readout mechanism embodied in the caliper of the invention. Many of the parts of the mechanism may be substantially the same as those used in the embodiment of FIGS. 2 and 3, and therefore FIGS. 4 and 5 are in generally schematic form. The only way in which the embodiment of FIGS. 4 and 5 differs significantly from that of FIGS. 2 and 3 resides in the substitution of a tight wire 100 and a pulley 102 for the gear rack and driven gear of FIGS. 2 and 3. Thus, the multiplier is composed of the pulley 102 and an anti-backlash driving gear 104, the driving gear 104 meshing with and driving a pinion gear 106 carrying the dial hand 108. The mountings for the gears may be substantially the same as those of the first embodiment, except that the multiplier gear need not have a floating mounting inasmuch as the tight wire will deflect the very small amounts that might be made necessary by deviations from alignment of the caliper main bar as the carriage moves along it.

The tight wire 100 is a thin flexible element of a material having a low coefficient of expansion such as stainless steel and is affixed directly at one end to a point near one end of the caliper bar and is attached through a tension spring 110 at a point near the other end of the bar. It is, of course, aligned longitudinally with the axis of the bar, and it is kept tight by the tension spring 110. The wire 100 makes one or more turns around the pulley 102, which is preferably formed with a peripheral flange along its edges to keep the wire from slipping off.

As the carriage is moved back and forth along the caliper bar, the tight wire 100 rotates the pulley 102 and the driving gear 104 which in turn drives the dial hand pinion 106 to read out the measurement on the dial, all in much the same manner as in the first embodiment. The pulley and gears are, of course, designed to provide one revolution of the dial hand for each 0.1 inch movement of the carriage where the dial face is graduated in 0.001 inch. An important advantage of the tight wire form of the caliper is that it is self-cleaning by virtue of the tendency for the wire to expel any dust or metal chips from the pulley as the wire leaves the pulley upon movement of the carriage.

As an optional feature but one of considerable advantage, the rack-type caliper of the invention may have a protective cover or shield on the main bar to keep out dust, metal chips, and other contaminating substances. The dust shield may take the form of a single strip of an appropriate flexible material fastened at its ends to the opposite ends of the caliper bar and guided through the readout mechanism case just below the dial face. The strip is guided into and out of the case at the plane of the bar surface and is tight so that the major portion lies flat on the bar.

A slightly modified form of protective cover, as shown in FIGS. 1–3, is composed of two strips 70 and 72 of resilient, flexible material, such as a suitable plastic, one of the strips extending generally along either side of the groove carrying the rack and the two strips overlapping slightly along a lengthwise band through the axis of the multiplier gear 52. The ends of the strips are secured near the ends of the caliper main bar and are guided below the readout mechanism case 32, and the outer margins of each strip abut the bar surface on either side of the groove. Deflector guides 74 and 76 depending from the case 32 deflect the strips 70 and 72 so that they do not interfere with the operation of the multiplier gear as it tracks along the gear rack.

The embodiments of the invention described above are intended to be merely exemplary, and those skilled in the art will be able to make numerous variations and modifications of them without departing from the spirit and scope of the invention. All such variations and modifications are intended to be included within the scope of the invention.

I claim:

1. A measuring instrument comprising an elongated bar, a carriage mounted for movement along the bar and having a portion thereon adapted to engage the piece to be measured, a toothed rack mounted on the bar, and a dial read-out mechanism carried by the carriage for movement therewith along the bar, the dial read-out mechanism including a case having a base element, a graduated dial face, a pinion gear rotatably mounted in the case for rotation about an axis perpendicular to the dial face and fixed relative to the graduations on the face, a dial pointer carried by the pinion gear, a cluster gear including a smaller gear portion meshing with and driven by the rack and a larger gear portion meshing with and driving the pinion, means mounting the cluster gear in the case for shifting movement toward and away from the toothed rack, the larger gear portion of the cluster gear being a split spring-loaded anti-backlash gear element and the axes of rotation of the cluster gear and pinion being located in a plane substantially parallel to the rack, and means resiliently urging the cluster gear into engagement with the rack thereby to hold the cluster gear in floating relation to the rack while the pinion gear and dial pointer remain in precise, centered relation to the dial face.

2. A measuring instrument according to claim 1 wherein the means movably mounting the cluster gear includes a bifurcated element having spaced-apart flange portions, one of which is disposed on each side of the larger gear portion, and bearing support means in each flange portion, thereby to rotatably carry the cluster gear at points on opposite sides thereof.

3. A measuring instrument according to claim 2 wherein the bifurcated element is movably mounted on the case by at least one spring.

4. A measuring instrument according to claim 3 wherein the bifurcated element is movably mounted on the case by two spaced leaf springs positioned generally coextensively with each other and generally parallel to each other and to the rack and spaced on opposite edges of the bifurcated element.

5. A measuring instrument according to claim 1 wherein the toothed rack is mounted in an elongated recess in the bar, and further comprising at least one strip of flexible material extending along and affixed to the bar and overlying the groove and abutting the bar surface on either side of the groove to restrict the intrusion of foreign materials into the groove and means on the case for deflecting the strip as the carriage is moved along the bar to afford free passage of cluster gear through the recess and prevent the strip from interfering with the operation of the dial read-out mechanism.

6. A measuring instrument according to claim 5 wherein there are two strips of flexible material extending longitudinally along the bar, overlying the groove and having overlapping portions lying longitudinally along the axis traversed by the cluster gear, the marginal portion of each strip abutting the surface of the bar adjacent the groove, thereby to restrict the intrusion of foreign materials into the groove, and wherein the deflecting means deflects both strips out of overlapping relation to prevent the strips from interfering with the operation of the read-out mechanism.

References Cited

UNITED STATES PATENTS

| | | |
|---|---|---|
| 443,869 | 12/1890 | Riglander. |
| 1,281,715 | 10/1918 | Todt. |
| 1,357,323 | 11/1920 | Jaques. |
| 1,621,526 | 3/1927 | Culell. |
| 2,030,320 | 2/1936 | Ricci. |
| 3,213,543 | 10/1965 | Masuda. |
| 3,261,101 | 7/1966 | Neumayer. |
| 3,302,294 | 2/1967 | Eguchi. |

FOREIGN PATENTS

| | | |
|---|---|---|
| 747,600 | 12/1966 | Canada. |
| 988,522 | 5/1951 | France. |
| 63,052 | 6/1892 | Germany. |
| 243,868 | 2/1947 | Switzerland. |

HARRY N. HAROIAN, *Primary Examiner.*

U.S. Cl. X.R.

33—125